United States Patent
Perez Leiva et al.

(10) Patent No.: US 10,686,384 B2
(45) Date of Patent: Jun. 16, 2020

(54) PARTIAL POWER CONVERTER (PPC) IN AN ELECTRICAL ENERGY SYSTEM

(71) Applicant: Universidad Técnica Federico Santa María, Valparaíso (CL)

(72) Inventors: Marcelo Alejandro Perez Leiva, Vina del Mar (CL); Jaime Wladmir Zapata Amores, Vina del Mar (CL); Samir Kouro Ranaer, Vina del Mar (CL)

(73) Assignee: UNIVERSIDAD TÉCNICA FEDERICO SANTA MARÍA, Valparaiso (CL)

( * ) Notice: Subject to any disclaimer, the term of this patent is extended or adjusted under 35 U.S.C. 154(b) by 0 days.

(21) Appl. No.: 16/327,609

(22) PCT Filed: Aug. 25, 2017

(86) PCT No.: PCT/CL2017/050044
§ 371 (c)(1),
(2) Date: Feb. 22, 2019

(87) PCT Pub. No.: WO2018/035625
PCT Pub. Date: Mar. 1, 2018

(65) Prior Publication Data
US 2019/0190392 A1    Jun. 20, 2019

(30) Foreign Application Priority Data
Aug. 25, 2016    (CL) .................................. 2155-2016

(51) Int. Cl.
*H02M 3/335* (2006.01)
*H02M 3/22* (2006.01)

(52) U.S. Cl.
CPC ......... *H02M 3/33553* (2013.01); *H02M 3/22* (2013.01)

(58) Field of Classification Search
CPC ............ H02M 3/22; H02M 3/24; H02M 3/28; H02M 3/335; H02M 3/33507;
(Continued)

(56) References Cited

U.S. PATENT DOCUMENTS

| 7,515,439 B2 | 4/2009 | Leu |
| 2009/0086514 A1 | 4/2009 | Fornage et al. |

(Continued)

FOREIGN PATENT DOCUMENTS

| JP | 2002315338 | * 10/2002 | ............... H02M 3/28 |
| WO | WO-2005091484 A1 | * 9/2005 | ............... H02M 1/34 |
| WO | WO-2010110688 A2 | * 9/2010 | ........ H02M 3/33592 |

OTHER PUBLICATIONS

A Novel Flyback-Based Inpuit PFC Stage for Electronic Ballasts in Lighting Applications. IEEE Transactions of Industry Applications, vol. 49, No. 2, Mar./Apr. 2013. Garcia, et al. 9 pages.

(Continued)

*Primary Examiner* — Matthew V Nguyen
(74) *Attorney, Agent, or Firm* — Lewis Brisbois Bisgaard & Smith, LLP

(57) ABSTRACT

A partial power converter (PPC) in an electrical power system, comprising an input capacitor connected in parallel to a power source $v_{pv}$ and connected to a primary winding of a transformer, wherein the primary winding is connected in series to a M1 transistor of the MOSFET (Metal Oxide Semiconductor Field Effect Transistor) type, wherein two secondary windings Ns1 and Ns2—both with the same number of turns, are connected, each one, in series by means of a terminal, with diodes D1 and D2, respectively, and the diodes D1 and D2 are connected to the respective ends of a capacitor $C_{dc}$ output; the other terminal of the secondary winding Ns1 of the transformer is connected to one of the terminals of the primary winding, whereas the other terminal of the secondary winding Ns2 is connected to one of the (Continued)

terminals of transistor M1, and wherein the output capacitor $C_{dc}$ serves as a link to connect to a next stage.

5 Claims, 5 Drawing Sheets

(58) Field of Classification Search
CPC ......... H02M 3/33523; H02M 3/33538; H02M 3/33546; H02M 3/33553
See application file for complete search history.

(56) References Cited

U.S. PATENT DOCUMENTS

2011/0176336 A1* 7/2011 Weng .................... H02M 3/156
363/21.04
2011/0215778 A1 9/2011 Chen

OTHER PUBLICATIONS

Written Opinion for related PCT/CL2017/050044.
International Search Report for related PCT/CL2017/050044.

* cited by examiner

US 10,686,384 B2

PARTIAL POWER CONVERTER (PPC) IN AN ELECTRICAL ENERGY SYSTEM

CROSS REFERENCE TO RELATED APPLICATIONS

This application is a national stage application under 35 U.S.C. 371 and claims the benefit of PCT Application No. PCT/CL2017/050044 having an international filing date of Aug. 25, 2017, which designated the United States, which PCT application claimed the benefit of Chilean Patent Application No. 2155-2016, filed Aug. 25, 2016, the disclosure of each of which are incorporated by reference herein.

FIELD OF THE INVENTION

The present invention relates to a static DC-DC converter that increases the input voltage, and further handles a reduced portion of the power delivered by an energy system as a power source. More specifically, it refers to a partial power converter (PPC) of the elevator type of an electric power system.

DESCRIPTION OF THE STATE OF THE ART

The patent application US2011215778 dated Sep. 8, 2011, entitled "Solar power converter with multiple outputs" by Chen Yu-kai describes a solar power converter with multiple outputs and conversion circuit thereof, wherein the solar power converter includes a power input terminal, a solar power unit and a solar power conversion circuit with multiple outputs including a primary circuit, a first output circuit, a second output circuit, and a transformer with a first auxiliary winding and a second auxiliary winding. An output terminal of the second output circuit is connected to the power input terminal in series for providing a third output voltage to a load unit. The third output voltage is a sum of an input voltage generated by the solar power unit and a second output voltage generated by the second output circuit.

The patent application US2011249474 dated Oct. 13, 2011, entitled "Method and apparatus for power conversion using a flyback converter" by Luo Yuhao describes a method and apparatus for performing power conversion using an interleaved flyback converter with alternating master and slave branches. The apparatus comprises a plurality of parallel connected flyback circuits; a controller is coupled to the switches within the flyback circuits to turn-on and turn-off the plurality of flyback circuits; a current monitor element at the output connected to the controller; a voltage monitor element connected to the controller; based on monitored current and voltage the controller controls the operation of flyback circuit.

The patent application US2009086514 dated Apr. 2, 2009, entitled "Flyback-type power converter" by Martin Fornage et al., describes a method and apparatus for converting DC input power to DC output power. The apparatus comprises a plurality of parallel connected flyback circuits. A controller is coupled to the switches within the flyback circuits to provide accurate timing and automatic current balancing amongst the plurality of flyback circuits.

None of the cited documents describes or teaches a static DC-DC converter that increases the input voltage, handling a reduced portion of the power delivered by an energy system as a power source.

SUMMARY OF THE INVENTION

An object of the invention is to develop a partial power converter (PPC) in an electrical energy system comprising an input capacitor connected in parallel to an energy source $v_{pv}$ and connected to a primary winding of a transformer, wherein the primary winding is connected in series to a transistor M1 of the MOSFET (Metal Oxide Semiconductor Field Effect Transistor) type, wherein two secondary windings Ns1 and Ns2—both with the same number of turns, are connected, each one, in series by means of a terminal, with diodes D1 and D2, respectively, and said diodes D1 and D2 are connected to the respective ends of an output capacitor $C_{dc}$; the other terminal of the secondary winding Ns1 of the transformer is connected to one of the terminals of the primary winding, whereas the other terminal of the secondary winding Ns2 is connected to one of the terminals of transistor M1, wherein the output capacitor $C_{dc}$ serves as a link to connect to a next stage; furthermore, a magnetization inductance Lm is present in the transformer, which is not physically connected, but it allows to represent the capacity of the transformer to store magnetic energy and transform it into voltage and current, where the energy source $v_{pv}$ is a solar energy source, and the power converter is partial and of the elevator type, since it handles a portion of the total power.

DESCRIPTION OF A PREFERRED EMBODIMENT

The present invention relates to a static DC-DC converter that increases the input voltage, and further handles a reduced portion of the power delivered by a power source. By managing a part of the power only, it is possible to increase the efficiency of the energy system, since the losses in the semiconductors are reduced. Due to the configuration, it is possible to improve the quality of voltage and current at the level of the input source, since the ripple in both variables is reduced. More specifically, it refers to a partial power converter (PPC) of the elevator type of an electric power system.

Figure 1:
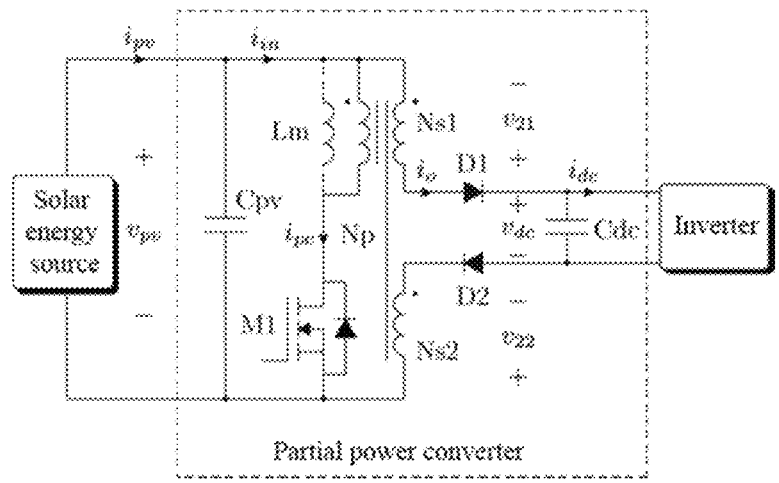
FIG. 1 describes a partial power converter in a photovoltaic solar application.

The applications of the invention are extended to those ones that require a direct-current voltage regulation. For the description of a preferred embodiment an application of the photovoltaic industry is described. The partial power converter (PPC) shown in FIG. 1 consists mainly of a transistor M1 of the MOSFET (Metal Oxide Semiconductor Field Effect Transistor) type and two diodes D1 and D2, which work depending on the operation to be executed, either allowing the passage of current or blocking the same. Furthermore, a transformer is used with a winding on the primary side with Np number of turns and two windings on the secondary side Ns1 and Ns2—both with the same number of turns. By having two secondary windings in the transformer, it is possible to have a first induced voltage $v_{21}$ and a second induced voltage $v_{22}$. In addition, it is considered that a magnetization inductance Lm is present in the transformer, which is not physically connected, but allows to represent the capacity of the transformer to store magnetic energy and transform it into voltage and current. The secondary windings, being directly connected to the primary one, allow to have a bypass path for a portion of the input current $i_{in}$, where said portion of current $i_o$ is injected directly into the inverter stage, which is used regularly to connect the system to the electricity network. The current that enters the partial power converter $i_{pc}$ is the difference between the current $i_{in}$ minus the current $i_o$. This current—being less than the total current, leads the converter to process only a portion of the power. In addition, due to the serial connection in the windings, it is possible to increase the voltage at the output of the converter, preventing the inverter from carrying out the entire process of increasing the input voltage $v_{pv}$, which implies a stress reduction both semiconductors as in the transformer. Another advantage deriving from the presented configuration is the reduction of the ripple of both the input current $i_{pv}$ as of the input voltage $v_{pv}$.

To define the concept of power partiality a variable $P_{pr}$ is defined, which is a ratio that relates the power handled by the $P_{pc}$ converter divided for the power delivered by the $P_{pv}$ system. If this ratio is less than the unity, then the converter is defined as a partial power converter. The closer the ratio is to zero, the smallest possible amount of power is handled by the converter. The power delivered by the $P_{pv}$ system is expressed as the multiplication of the input voltage $v_{pv}$ by the input current $i_{pv}$, while the power handled by the $P_{pc}$ converter is represented as the multiplication of the input voltage $v_{pv}$ by the current that enters the converter $i_{pc}$. The output power of the converter $P_o$ is expressed as the multiplication of the output voltage $v_{dc}$ by the output current $i_{dc}$. Considering that the efficiency of the system η is equal to the ratio between the output power $P_o$ divided for the input power $P_{in}$, and said efficiency is unitary, the partiality ratio is expressed with the following equation (1), $$P_{pr} = \frac{1}{\eta} - \frac{1}{G_v} \quad (1)$$

Figure 2:
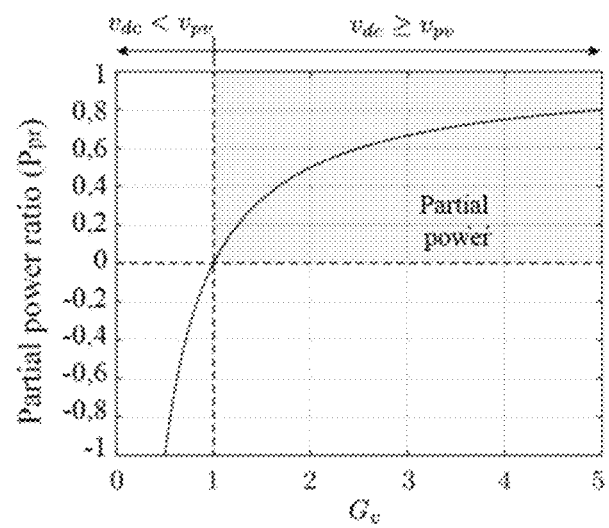
FIG. 2 describes the partial-power ratio curve depending on the relation between output voltage and input voltage.

FIG. 2 shows the graph that represents the power partiality ratio $P_{pr}$. It is appreciated that the partial power ratio depends on the voltage gain Gv, which is the ratio between the output voltage $v_{dc}$ divided for the input voltage $v_{pv}$. Due to the configuration, it is considered as a partial power converter provided that the output voltage is greater than the input voltage, since the power only flows in one direction and must be positive. In addition, the figure shows that the power partiality ratio $P_{pr}$ is inferior, as long as the voltage gain decreases.

Figure 3:
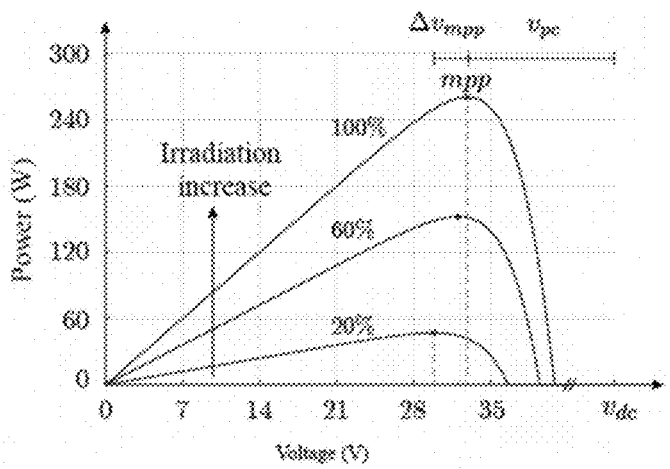
FIG. 3 describes the variation of power and voltage as a function of the solar irradiation variation.

It is known that the partial power converter must be able to increase the voltage to reach the required output value $v_{dc}$; furthermore, the input voltage at the solar panel level $v_{pv}$ varies depending on the solar irradiation, as described in FIG. 3, where this voltage variation is shown as $\Delta_{vmpp}$. In this case, the objective is to maintain the voltage of the solar panel at the point of maximum power mpp. By varying this value, the partial power converter must be able to compensate this variation by modifying the voltage $v_{pc}$. The lower the ratio of power partiality Ppr, less power is processed by the partial power converter, which improves its efficiency. While the higher the ratio of power partiality $P_{pr}$, more power is processed by the partial power converter, which guarantees the operation over a greater range of voltage variation $\Delta_{vmpp}$. Therefore, the application of the invention will be the one defined by the point of operation and it is the one that serves as the basis for the design of the partial power converter.

To conduct the analysis of the functioning, the ideal operation of the partial power converter is assumed. The number of turns in the secondary windings Ns1 and Ns2 is equal; therefore, Ns is defined as the number of turns of the secondary winding, which guarantees that the voltages v21 and v22 are similar and avoids imbalances in the currents reflected to the primary side. Under this criterion a new variable $v_2$ is defined that is equal to $v_{21}$ and equal to $v_{22}$. Therefore, the output voltage $v_{dc}$ is equal to the sum of the input voltage $v_{pv}$ plus twice the voltage $v_2$. In addition, the variable N is defined as the ratio of turns between the turns of the primary winding Np divided by the turns of the secondary winding Ns.

Figure 4:
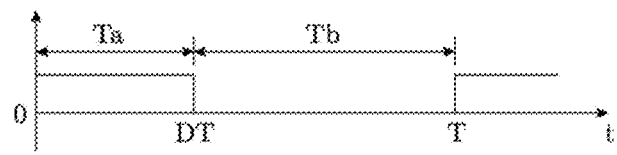
FIG. 4 describes the time interval corresponding to the switching of the semiconductors.

The operation of the partial power converter is deduced by the switching states of the semiconductors M1, D1 and D2. FIG. 4 shows the time interval in which the MOSFET M1 is turned on and off. During the time Ta the MOSFET M1 is activated, thus allowing the passage of current $i_{pc}$ and the diodes D1 and D2 turn off, whereas the MOSFET M1 turns off during the time Tb, thus interrupting the passage of the current $i_{pc}$, and the diodes D1 and D2 turn on. The switching period is represented as T, which represents the sum of the time Ta plus Tb. The working cycle D is defined as the ratio between the time that Ta is activated divided for the switching period T. The working cycle varies between 0-1.

Figure 5:
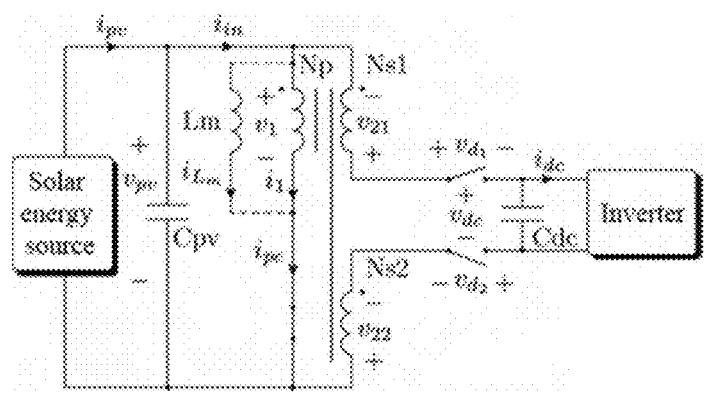
FIG. 5 describes the operation principle of the power converter when the MOSFET M1 is activated and the diodes D1 and D2 are turned off.

During the time interval between [0<t≤DT] the MOSFET M1 is activated, whereas the diodes D1 and D2 are turned off as shown in FIG. 5; during this interval, the voltage at the magnetization inductance $v_1$ is equal to the voltage at the input source $v_{pv}$. The current through the magnetization inductance Lm grows linearly with a slope as shown in the following equation (2), $$\frac{di_{L_m}}{dt} = \frac{v_{pv}}{L_m} \quad (2)$$

The current in the MOSFET M1 grows with the same slope described in equation (2), whereas the voltage is zero. During this time the diodes D1 and D2 are off; therefore, the current $i_o$ is zero, whereas the voltage in each of the diodes is described as the primary voltage reflected to the secondary side plus half the difference between the output voltage and the input voltage (3), $$v_d = -\left(\frac{v_{pv}}{n} + \frac{v_{dc} - v_{pv}}{2}\right) \quad (3)$$

Figure 6:
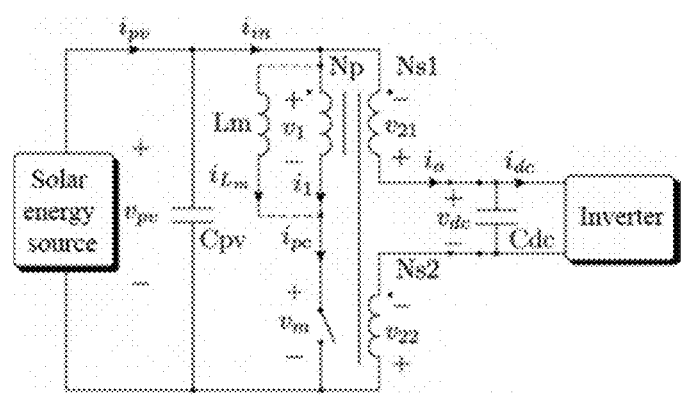
FIG. 6 describes the operation principle of the power converter when the MOSFET M1 is turned off and the diodes D1 and D2 are activated.

During the time interval between [DT<t≤T] the MOSFET M1 turns off, whereas the diodes D1 and D2 are activated as shown in FIG. 6. During this interval, the voltage in the magnetization inductance $v_1$ is equal to the voltage in the output source $v_2$ reflected on the primary of the transformer with negative sign, due to the connection of the windings. The current through the magnetization inductance $L_m$ decreases linearly with a slope as shown in the following equation (4), $$\frac{di_{L_m}}{dt} = -\frac{N(v_{dc} - v_{pv})}{2L_m} \quad (4)$$

The current in the MOSFET M1 is zero during the switching interval, whereas the voltage in the MOSFET M1 is the sum of the input voltage $v_{pv}$ plus half the difference between the output voltage $v_{dc}$ minus $v_{pv}$ reflected on the primary of the transformer, $$v_m = v_{pv} + \frac{N(v_{dc} - v_{pv})}{2} \quad (5)$$

Assuming the analysis with ideal diodes, the voltage in the diodes is zero, the current in the diodes $i_o$ decreases with the same slope described in equation (4) reflected on the secondary of the transformer.

It is possible to relate the behavior of the dynamics of the current in the inductance $L_m$ for both switching intervals with the following equation (6), $$\frac{di_{L_m}}{dt} = \frac{v_{pv}}{L_m}D - \frac{N(v_{dc} - v_{pv})}{2L_m}(1-D) \quad (6)$$

In steady state, i.e., when there are no variations around the point of operation, the value of the derivative of the current with respect to time is zero. Then equation (6) is worded as follows:

$$0 = \frac{v_{pv}}{L_m}D - \frac{N(v_{dc} - v_{pv})}{2L_m}(1-D) \quad (7)$$

By ordering the equation (7), there is the equation (8) existing between the output voltage $v_{dc}$ and the input voltage $v_{pv}$, $$\frac{v_{dc}}{v_{pv}} = G_v = \frac{2D}{N(1-D)} + 1 \quad (8)$$

This equation (8) is also known as the voltage gain Gv of the partial power converter.

Figure 7:
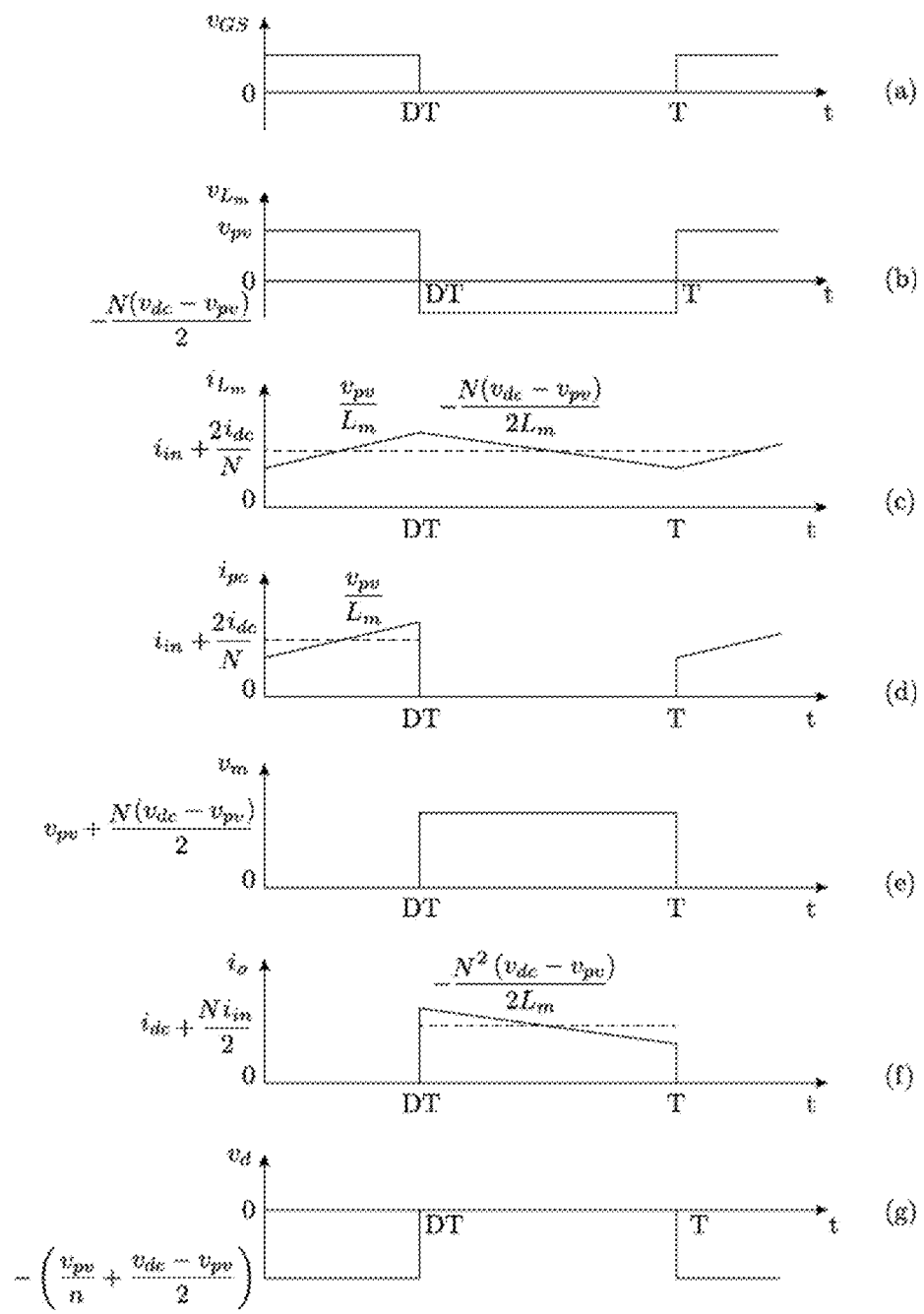
FIG. 7 illustrates the waveforms of the above-detailed points for the analyzed switching instants, in addition to the mean value for the currents both in the MOSFET M1 as in the diodes D1 and D2.

FIG. 7 illustrates the ideal current and voltage waveforms of the above-detailed points for the switching instants analyzed, along with the mean value for the currents both in the M1 as in the diodes D1 and D2: (a) trigger signal for the MOSFET M1; (b) voltage in the magnetization inductance Lm; (c) current in the magnetization inductance Lm; (d) current in the MOSFET M1; (e) voltage in the MOSFET M1; (f) current in diodes D1-D2; (g) voltage in diodes D1-D2.

Figure 8:
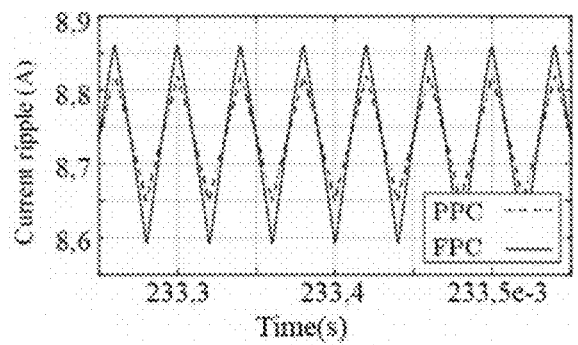
FIG. 8 describes the Ripple of input current ipv in partial power converter (PPC) and traditional flyback converter (FPC).
Figure 9:
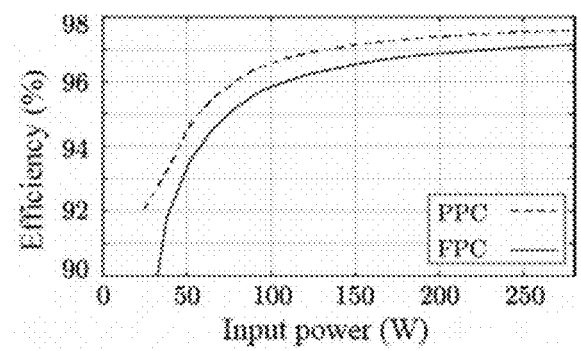
FIG. 9 describes the overall efficiency of the partial power converter (PPC) and traditional flyback converter (FPC) based on the input power.

Simulation tests have been conducted in order to validate the proposed partial power converter, in addition to comparing it with a traditional flyback converter. For this experiment, both converters have been designed to work in the same operation points. A photovoltaic panel was used as an input source, and a DC-AC converter was used to connect to a single-phase network. For the design, it has been considered that the working cycle is equal to half of the commutation period D=0.5, which allows a symmetrical magnetic flow in the transformer, and therefore the losses by magnetic transfer are reduced. The current ripple in the solar panel $\Delta_{ipv}$ and the overall efficiency of the DC-DC conversion stage have been considered as comparison measures. The first parameter is related to the design of the input capacitor and the efficiency of the tracking of the maximum power point. By presenting a lower current ripple value, then the size of the capacitor can be reduced. Furthermore, the point of maximum power shows oscillations of smaller amplitude. FIG. 8 shows the results obtained from the current ripple, wherein the partial power converter has a lower current ripple than the traditional flyback converter (FPC). FIG. 9 shows the results obtained from the overall efficiency of the partial power converter, i.e., the efficiency associated with the tracking of the maximum power point and the conversion efficiency. In the same way as in the previous case, they have been compared in both converters and the overall efficiency of the proposed partial power converter is greater due to the above-mentioned advantages, which are the lower elevation ratio and the smaller current ripple.

From the constructive point of view, the converter consists of a capacitor connected in parallel to the power source; a transformer with a primary winding and two secondary windings is required. The primary winding is connected in series to a MOSFET M1 and this is connected in parallel with the input capacitor. The secondary windings—both with the same number of turns, are connected in series with the diodes and the output capacitor. A terminal of one of the secondary windings of the transformer is connected to one of the terminals of the primary winding, whereas from the other secondary winding, one of the terminals is connected to one of the terminals of the MOSFET M1. The output capacitor serves as a link to connect to a next stage, which will depend on the application.

The invention claimed is:

1. A partial power converter (PPC) in an electric power system, comprising:
an input capacitor connected in parallel to a power source and connected to a primary winding of a transformer, wherein the primary winding is connected in series to a transistor of the Metal Oxide Semiconductor Field Effect Transistor (MOSFET) type;
a first secondary winding with a first number of turns;
a second secondary winding with a second number of turns, the first number of turns being equal to the second number of turns;
wherein the first and second secondary windings are connected in series by means of a terminal with a first diode connecting the first secondary winding to a first end of an output capacitor and a second diode connecting the second secondary winding to a second end of the output capacitor diodes, wherein an opposite terminal of the first secondary winding of the transformer is connected to one of the terminals of the primary winding, wherein an opposite terminal of the second secondary winding is connected to one of the terminals of transistor, and wherein the output capacitor serves as a link to connect to a next stage.

2. The partial power converter according to claim 1, further comprising a magnetization inductance presented in the transformer, which is not physically connected, but allows to represent the capacity of the transformer to store magnetic energy and transform it into voltage and current.

3. The partial power converter according to claim 1, wherein the energy source is a solar energy source.

4. The partial power converter according to claim 1, wherein it is of an elevator type.

5. The partial power converter according to claim 1, wherein it handles a portion of the total power.

* * * * *